United States Patent
Aoki et al.

(10) Patent No.: US 8,754,592 B2
(45) Date of Patent: Jun. 17, 2014

(54) AUTOMOBILE LED DRIVING DEVICE

(75) Inventors: Akira Aoki, Kyoto (JP); Koji Miyamoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 300 days.

(21) Appl. No.: 13/241,505

(22) Filed: Sep. 23, 2011

(65) Prior Publication Data

US 2012/0074845 A1 Mar. 29, 2012

(30) Foreign Application Priority Data

Sep. 29, 2010 (JP) .................................. 2010-218618

(51) Int. Cl.
*H05B 37/02* (2006.01)
(52) U.S. Cl.
USPC .............................. 315/307; 315/77; 315/119
(58) Field of Classification Search
USPC ............. 315/77, 82, 224, 225, 291, 294, 297, 315/307, 308; 307/10.8
See application file for complete search history.

(56) References Cited

U.S. PATENT DOCUMENTS

| | | |
|---|---|---|
| 5,765,940 A | 6/1998 | Levy et al. |
| 2002/0191416 A1 | 12/2002 | Wesson |
| 2003/0025465 A1* | 2/2003 | Swanson et al. ............... 315/291 |
| 2004/0179367 A1* | 9/2004 | Takeda et al. .................. 362/466 |
| 2007/0182337 A1 | 8/2007 | Kunjappan |
| 2007/0273306 A1* | 11/2007 | Fujino et al. ................... 315/312 |
| 2009/0154188 A1 | 6/2009 | Ito et al. |
| 2010/0213845 A1* | 8/2010 | Aiello .............................. 315/77 |
| 2011/0133645 A1* | 6/2011 | Kuo et al. ........................ 315/77 |

FOREIGN PATENT DOCUMENTS

| | | |
|---|---|---|
| EP | 2 200 403 | 6/2010 |
| JP | 2006-313808 | 11/2006 |

OTHER PUBLICATIONS

European Extended Search Report for EP Application No. 11182851.3, 6 pages (Mar. 14, 2012).

* cited by examiner

*Primary Examiner* — Tung X Le
(74) *Attorney, Agent, or Firm* — Fish & Richardson P.C.

(57) ABSTRACT

An automobile LED driving device includes a current setting portion to set multiple reference currents independently from one another for multiple respective current setting resistors connected externally, a current controller to select one of the multiple reference currents based on a control signal provided from outside, and an output transistor to control an output current to an automobile LED connected externally based on the reference current selected by the current controller.

18 Claims, 18 Drawing Sheets

US 8,754,592 B2

AUTOMOBILE LED DRIVING DEVICE

CROSS-REFERENCE TO RELATED APPLICATIONS

This application claims the benefit of priority of Japanese patent application No. 2010-218618 (filing date: 2010/09/29), which is incorporated herein by reference in its entirety.

BACKGROUND OF THE INVENTION

1. Field of the Invention

This invention relates to an automobile LED driving device to drive and control the automobile LED [Light Emitting Diode] (e.g., a rear lump or a room light).

2. Description of Related Art

FIG. 18 is a circuit diagram illustrating a conventional example of the automobile LED driving device. With respect to an automobile LED driving device in accordance with this conventional example, a switch 201 is turned ON when turning ON the tail lump and the switch 202 is turned OFF. As a result, when turning ON the tail lump, a current I1 flows from a battery 100 to a light emitting diode row 600 via a switch 201, a diode 301, a resistor 401, and a resistor 500. On the other hand, when turning ON the brake lump, the switch 201 is turned OFF and the switch 202 is turned ON. As a result, when turning ON the brake lump, a current I2 flows from the battery 100 to the light emitting diode row 600 via the switch 202, the diode 302, the resistor 402, and the resistor 500. Here, the resistor 402 has a smaller resistance than the resistor 401. Accordingly, the current I2 flowing when turning ON the brake lump becomes larger current value than the current I1 flowing when turning ON the tail lump, the light emitting diode row 600 emits the light brighter when turning ON the brake lump than when turning ON the tail lump.

In addition, as an example of related conventional technique to the aforementioned technique, Japanese patent publication No. 2006-313808 can be listed.

However, with respect to the aforementioned conventional automobile LED driving device, to adjust the light emission amount of the light emitting diode row 600 when both of turning ON the tail lump and the break lump, resistances of the resistors 401 and 402 located on the current way to the light emitting diode row 600 have to be adjusted, it is difficult to adjust the light emission amount of the light emitting diode row 600 highly accurately.

SUMMARY OF THE INVENTION

Therefore, in view of the aforementioned problems identified by the inventor of this application, a purpose of the invention is to provide an automobile LED driving device to adjust an output current to the automobile LED easily and highly accurately.

To achieve the purpose, an automobile LED driving device in accordance with the invention includes a current setting portion to set multiple reference currents independently from one another for multiple respective current setting resistors connected externally, a current controller to select one of the multiple reference currents based on a control signal provided from outside, and an output transistor to control an output current to an automobile LED connected externally based on the reference current selected by the current controller.

In addition, other features of the invention, elements, steps, advantages, and characteristics will be apparent from the following description of the best mode and the drawings and the claims related to the description.

DETAILED DESCRIPTION OF PREFERRED EMBODIMENTS

<An Entire Block Diagram>

Figure 1:
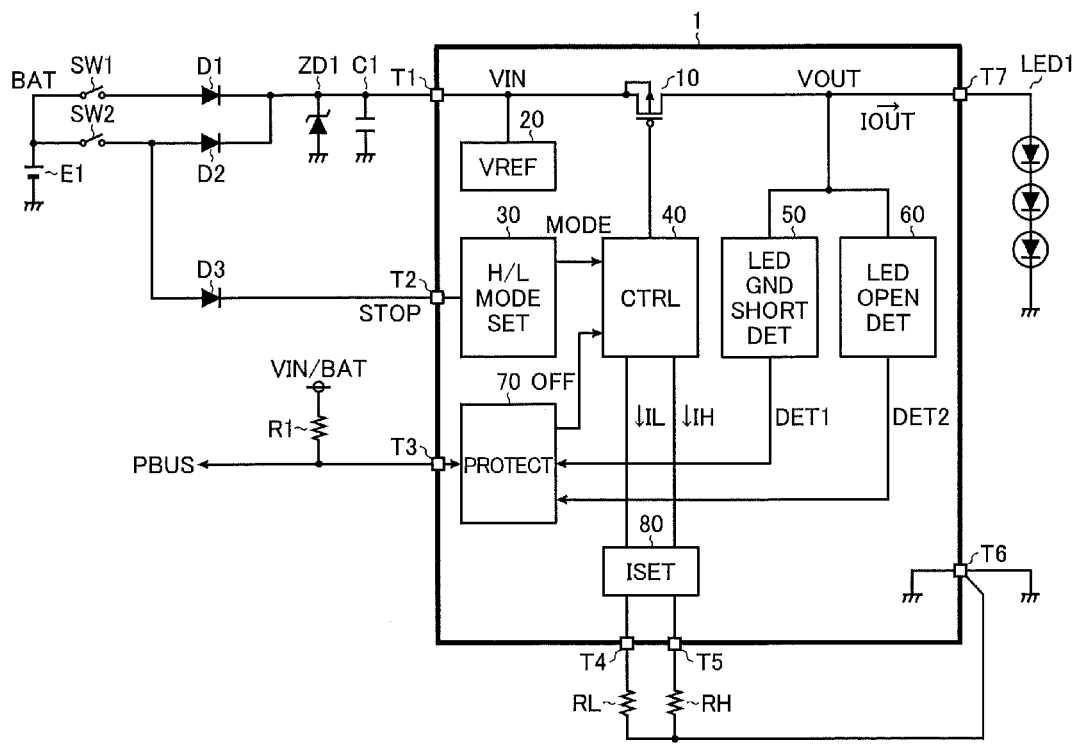
FIG. 1 is a block diagram illustrating a construction example of an automobile LED driver IC in accordance with the invention.

FIG. 1 is a block diagram illustrating a construction example of an automobile LED driver IC in accordance with the invention. The automobile LED driver IC1 (referred as "IC1" below) is a semiconductor integrated circuit device including an output transistor 10, a reference voltage generator 20, a H/L mode setting portion 30, a current controller 40, a LED ground short detector 50, a LED open circuit detector 60, a protect bus controller 70 (referred as "PBUS controller 70"), and a current setting portion 80.

Moreover, as a method to establish an electrical connection to outside, the IC1 includes external terminals T1 to T7. The external terminal T1 is a turn-ON signal input terminal (VIN terminal). The external terminal T2 is a brake light input terminal (STOP terminal). The output terminal T3 is an abnormality detection input/output terminal (PBUS terminal). The external terminal T4 is a current setting terminal for L-mode (ISETL terminal). The external terminal T5 is a current setting terminal for H-mode (ISETH terminal). The terminal T6 is a ground terminal (GND terminal). The external terminal T7 is a current output terminal (IOUT terminal).

Moreover, a battery E1, switches SW1 and SW2, diodes D1 to D3, a zener diode ZD1, a capacitor C1, a pull up resister R1, current setting resisters RL and RH, and a light emitting diode row LED1 are connected to the IC1 externally.

The positive terminal of the battery E1 is connected to respective first terminals of the switches SW1 and SW2. The negative terminal of the battery E1 is connected to the ground terminal. The second terminal of the switch SW1 is connected to the anode of the diode D1. The second terminal of the switch SW2 is connected to respective anodes of the diodes D2 and D3. The cathodes of the diode D1 and D2 are connected to the external terminal T1 respectively. The cathode of the diode D3 is connected to the external terminal T2. The cathode of the zener diode ZD1 is connected to the external terminal T1. The anode of the zener diode ZD1 is connected to the ground terminal. The first terminal of the capacitor C1 is connected to the external terminal T1. The second terminal of the capacitor C1 is connected to the ground terminal. The first terminal of the pull up resistor R1 is connected to the external terminal T1 (the voltage applying terminal for the input voltage VIN) or the positive terminal of the battery E1 (the voltage applying terminal for the battery voltage BAT). The second terminal of the pull up resistor R1 is connected to the external terminal T3. The first terminal of the current setting resistor RL is connected to the external terminal T4. The first terminal of the current setting resistor RH is connected to the external terminal T5. The second terminal of the current setting resistors RL and RH are connected to the ground terminal respectively. The external terminal T6 is connected to the ground terminal. The external terminal T7 is connected to the anode of the light emitting diode row LED1. The cathode of the light emitting diode row LED1 is connected to the ground terminal.

The switch SW1 is turned ON when turning ON the tail lump, and the switch SW2 is turned OFF. As a result, when turning ON the tail lump, the input voltage VIN is applied to the external terminal T1 from the battery E1 via the switch SW1 and the diode D1. Moreover, the stop signal STOP provided to the external terminal T2 becomes a low level (i.e., high impedance). On the other hand, when turning ON the break lump, the switch SW1 is turned OFF and the switch SW2 is turned ON. As a result, when turning ON the break lump, the input voltage VIN is applied to the external terminal T2 from the battery E1 via the switch SW2 and the diode D2. Moreover, the stop signal STOP provided to the external terminal T2 becomes a high level (i.e., battery voltage BAT).

<Schematic of a Circuit Block>

The output transistor 10 is a switch element to control the output current IOUT to the light emitting diode row LED1 based on a direction of the current controller 40. With respect to the IC1, PMOS FET [Metal Oxide Semiconductor] is used as the output transistor 10. The source and the back gate of the output transistor 10 are connected to the external terminal T1. The drain of the output transistor 10 is connected to the external terminal T7. The gate of the output transistor 10 is connected to the current controller 40.

The reference voltage generator 20 generates a predetermined reference voltage VREF from the input voltage VIN applied to the external terminal T1.

The H/L mode setting portion 30 generates the mode setting signal MODE based on the stop signal STOP provided to the external terminal T2 and provides it to the current controller 40.

The current controller 40 selects either one of the first reference current IL and the second reference current IH as the reference current IREF based on the mode setting signal MODE, and drives and controls the output transistor 10 so as the output current IOUT according to the result of the selection is supplied to the light emitting diode row LED1.

The LED ground short detector 50 detects the ground short of the light emitting diode row LED1 (i.e., a state the external terminal T7 is shorted to the ground terminal or the low voltage potential terminal which is equivalent to the ground terminal) and provides the LED ground short detection signal DET1. The LED ground short detection signal DET1 is a binary signal which becomes a low level when not detecting the LED ground short, and becomes a high level when detecting the LED ground short.

The LED open circuit detector 60 detects the open circuit of the light emitting diode row LED1 (i.e., a state where the external terminal T7 is disconnected to the light emitting diode row LED1) and provides the LED open circuit detection signal DET2. The LED open circuit detection signal DET2 is a binary signal which becomes a low level when not detecting the LED open circuit, and becomes a high level when detecting the LED open circuit.

PBUS controller 70 generates the protect bus signal PBUS according to with or without the detection of the abnormality, and performs input/output with outside. Moreover, the PBUS controller 70 generates forcible off signal OFF based on the protect bus signal PBUS, and provides the signal to the current controller 40.

The current setting portion 80 sets each of the first reference current IL according to the first current setting resistance RL and the second reference current IH (IH>IL) according to the second current setting resistance RH separately.

In addition, as not illustrated in FIG. 1, apart from the aforementioned circuit block, an over voltage protector, a thermal protector, and a ground short detector and an open circuit detector for the current setting resistors RL and RH are integrated to the IC1.

<Characteristic>

The first characteristic of the IC1 is designed as the voltage range for the input voltage VIN is wide as 5.5V to 40V. The second characteristic is including the variable constant current source driver internally as the current controller 40. The third characteristic is including the H/L mode setting portion 30 internally. The fourth characteristic is including the LED open circuit detector 50 and the LED short detector 60 internally. The fifth characteristic is including the ground short detector and the open circuit detector for the current setting resistors RL and RH internally. The sixth characteristic is including the over voltage protector and the thermal protector internally. The seventh characteristic is including the PBUS controller 70 (a functional member to detect an output of abnormality) internally.

The IC1 is a LED source driver IC with high withstand voltage (50V). The IC1 can control a constant current output of the output current IOUT. Moreover, the IC1 can control a current switching of the output current IOUT (i.e., H/L mode switching control). Therefore, the IC1 is suitable as a driving method for driving the automobile LED of the rear lump or the white LED. Moreover, because the IC1 includes several kinds of protection functions internally (i.e., protection functions for the ground short and the open circuit of the light emitting diode row LED1, protection functions for the ground short and the open circuit of the current setting resistors RL and RH, a overvoltage protection function, a thermal protection function), it is possible to realize a high reliability. Moreover, the PBUS controller 70 is included to the IC 1 internally, when driving the light emitting diode row by multiple drivers (i.e., using multiple of IC1s), in the case of the ground short or the open circuit occurred at light emitting diode row by accident, all line of light emitting diode rows can be turned OFF forcibly at one time.

<A H/L Mode Setting Portion, a Current Controller>

Figure 2:
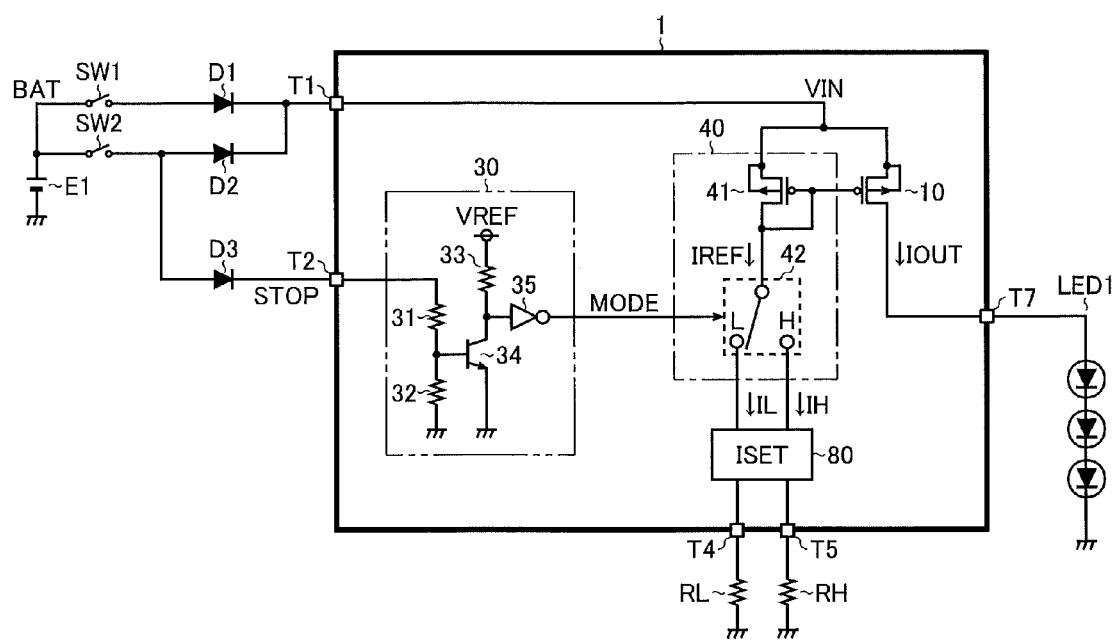
FIG. 2 is a circuit diagram illustrating a construction example of a H/L mode setting portion 30 and a current controller 40.

FIG. 2 is a circuit diagram illustrating a construction example of a H/L mode setting portion 30 and a current controller 40.

The H/L mode setting portion 30 includes the resistors 31 to 33, a npn bipolar transistor 34, and an inverter 35. The first terminal of the resistor 31 is connected to the external terminal T2. Both the second terminal of the resistor 31 and the first terminal of the resistor 32 are connected to the base of the transistor 34. The second terminal of the resistor 32 is connected to the ground terminal. The first terminal of the resistor 33 is connected to the applying terminal of the reference voltage VREF. The second terminal of the resistor 33 is connected to the collector of the transistor 34. The emitter of the transistor 34 is connected to the ground terminal. The input terminal of the inverter 35 is connected to the collector of the transistor 34. The output terminal of the inverter 35 is connected to the current controller 40 (i.e., to be more concrete, the control terminal of the selector 42 described later) which functions as an output terminal of the mode setting signal MODE.

With respect to the aforementioned H/L mode setting portion 30, the switch SW2 is turned ON when turning ON the brake lump, while the stop signal STOP is set as a high level (=battery voltage BAT), the mode setting signal MODE is set as a high level (=reference voltage VREF). Meanwhile, when the switch SW2 is turned OFF and the stop signal STOP is set as a low level (=high impedance) when turning ON the tail lump, the mode setting signal MODE is set as a low level (=GND). In other words, the H/L mode setting portion 30 functions as a level shifter to shift the voltage level of the stop signal STOP and generates the mode setting signal MODE.

The current controller 40 includes the PMOS FET 41 and the selector 42. The source and the back gate of the transistor 41 are connected to the external terminal T1. The gate of the transistor 41 is connected to the drain of the transistor 41 with the gate of the output transistor 10. The drain of the transistor 41 is connected to the common terminal (i.e., an input terminal of the reference current IREF) of the selector 42. The first selection terminal (L) of the selector 42 is connected to the input terminal of the first reference current IL. The second selection terminal (H) of the selector 42 is connected to the input terminal of the second reference current IH. The control signal of the selector 42 is connected to the voltage applying terminal of the mode setting signal MODE (i.e., the output terminal of the inverter 35).

With respect to the aforementioned current controller 40, the selector 42 selects either one of the first reference current IL (i.e., low current) and the second reference current IH (i.e., high current) as the reference current IREF based on the mode setting signal MODE (i.e., furthermore, the stop signal STOP according to the light ON/OFF state of the brake lump). To be more concrete, the selector 42 connects the first selection terminal (L) with the common terminal when the mode setting signal MODE is low, then selecting the first reference current IL as the reference current IREF. Meanwhile, the selector 42 connects the second selection terminal (H) with common terminal when the mode setting signal MODE is a high level, then the second reference current IH is selected as the reference current IREF.

The transistor 41 forms a current mirror circuit with the output transistor 10, and functions as an input transistor to generate the mirror current (=output current IOUT) to the output transistor 10 according to the reference current IREF provided to the transistor 41. Hereinafter, the transistor 41 is referred as the input transistor 41 properly. To be more concrete, when turning ON the tail lump, the first reference current IL (i.e., low current) flows as the output current IOUT, and the second reference current IH (i.e., high current) flows the output current IOUT when turning ON the brake lump. The light emitting diode row LED1 emits the brighter light when turning ON the brake lump than turning ON the tail lump. In addition, both of the output transistor 10 and the input transistor 41 are designed as high withstand voltage elements which can withstand a voltage potential difference with the input voltage VIN and the ground voltage GND.

As mentioned above, with respect to the IC1, as a current supply source to the light emitting diode row LED1, not a sink driver, but a source driver using a high withstand voltage element is included to the IC1 internally. Owing to this construction, a fluctuation caused by the forward drop voltage VF across the light emitting diode row LED1 and a discrepancy of the output current IOUT caused by a gap of the input voltage VIN can be controlled, it is not required select defective LED in a manufacturing process, furthermore, reduction of substrates or simplification of product design can be realized.

Moreover, by using the IC1, because an occupying area on the substrate can be reduced compared to the conventional construction which uses discrete components, a flexibility of a layout can be improved and design for the automobile can be improved.

<Improvement for High Accuracy of a Source Driver>

Figure 3:
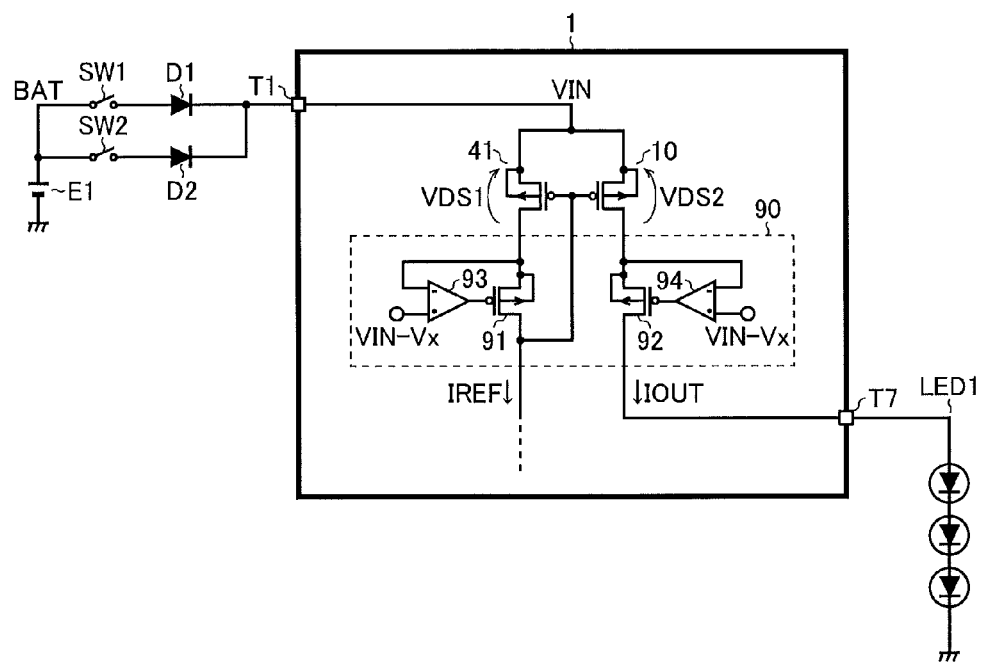
FIG. 3 is a circuit diagram illustrating a construction example of a bias portion 90.

As illustrated in FIG. 3, as a method to realize the improvement of the high accuracy for the aforementioned source driver, the IC1 further includes a bias portion 90 to equalize the source-drain voltage VDS1 of the input transistor 41 and the source-drain voltage VDS2 of the output transistor 10.

FIG. 3 is a circuit diagram illustrating a construction example of the bias portion 90. The bias portion 90 of this construction example includes PMOS FETs 91 and 92, and the operational amplifiers 93 and 94. The source and the back gate of the transistor 91 are connected to the drain of the transistor 41. The drain of the transistor 91 is connected to the input terminal of the reference current IREF. The gate of the transistor 91 is connected to the output terminal of the operational amplifier 93. The source and back gate of the transistor 92 is connected to the drain of the output transistor 10. The drain of the transistor 92 is connected to the external terminal T7. The gate of the transistor 92 is connected to the output terminal of the operational amplifier 94. The non-inverting input terminal (+) of the operational amplifier 93 is connected to the predetermined bias voltage (=VIN−Vx). The inverting input terminal (−) of the operational amplifier 93 is connected to the source of the transistor 91. The non-inverting input terminal (+) of the operational amplifier 94 is connected to the voltage applying terminal of the predetermined bias voltage (=VIN−Vx). The inverting input terminal (−) of the operational amplifier 94 is connected to the source of the transistor 92. In addition, both the operational amplifiers 93 and 94 are made of high withstand voltage element which can withstand a voltage potential difference between the input voltage VIN and the ground voltage GND.

Owing to the bias portion 90 of the aforementioned construction, the source-drain voltage VDS1 of the input transistor 41 and the source-drain voltage VDS2 of the output transistor 10 can be equalized to the same voltage (=Vx), it is possible to prevent the gap of the mirror ratio efficiently caused by the channel-length-fluctuation-effect of the transistor. Accordingly, even if the input voltage VIN or a number of the serial phase of the light emitting diode row LED1 (i.e., furthermore, the forward drop voltage VF) are changed, it is possible to maintain the input voltage VIN or the output current IOUT constantly, the improvement of the high accuracy for the aforementioned source driver can be realized.

<A Current Setting Portion>

Figure 4:
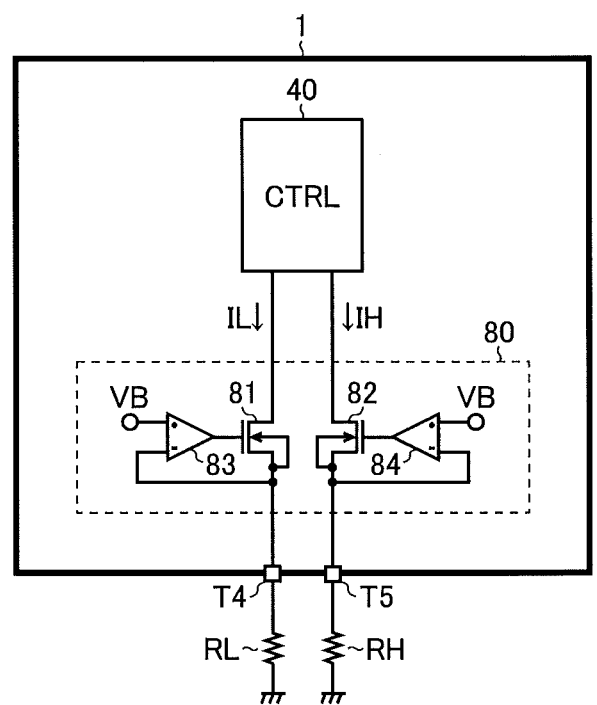
FIG. 4 is a circuit diagram illustrating a first construction example of a current setting portion 80.

FIG. 4 is a circuit diagram illustrating a first construction example of the current setting portion 80. The current setting portion 80 in accordance with the first construction example includes the NMOS FETs 81 and 82 and the operational amplifiers 83 and 84. The source and the back gate of the transistor 81 are connected to the external terminal T4. The drain of the transistor 81 is connected to the current controller 40 as the output terminal of the first reference current IL. The gate of the transistor 81 is connected to the output terminal of the operational amplifier 83. The source and the back gate of the transistor 82 are connected to the external terminal T5. The drain of the transistor 82 is connected to the current controller 40 as the output terminal of the second reference current IH. The gate of the transistor 82 is connected to the output terminal of the operational amplifier 84. The non-inverting input terminal (+) of the operational amplifier 83 is connected to the voltage applying terminal of the predetermined bias voltage VB. The inverting input terminal (−) of the operational amplifier 83 is connected to the source of the transistor 81. The non-inverting input terminal (+) of the operational amplifier 84 is connected to the voltage applying terminal of the predetermined bias voltage VB. The inverting input terminal (−) of the amplifier 84 is connected to the source of the transistor 82.

With respect to the current setting portion 80 in accordance with the first construction example, both the first reference current IL (=VB/RL) and the second reference current IH (=VB/RH) are generated by applying the predetermined bias voltage VB to each of the current setting resistors RL and RH. In this way, with respect to the current setting portion 80, both the output current IOUT (=first reference current IL) when turning ON the tail lump and the output current IOUT (=second reference current IH) when turning ON the brake lump can be set independently and appropriately by adjusting the resistances of the current setting resistors RL and RH. Accordingly, the output current IOUT which has different optimum value depends on the kind of the automobile can be adjusted easily and highly accurately.

Figure 5:
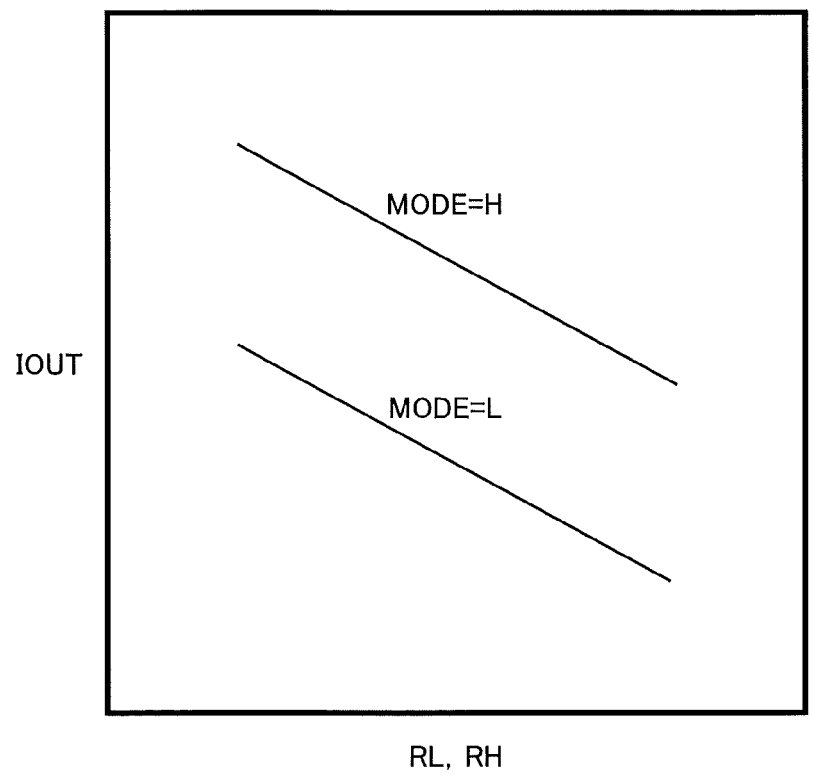
FIG. 5 is a R/I correlation diagram illustrating a first current setting characteristic.

In addition, the first current setting characteristic realized in the current setting portion 80 in accordance with the first construction example becomes negative characteristic (i.e., the larger the resistances of the current setting resistors RL and RH become, the lower the first reference current IL and the second reference current IH become). FIG. 5 is a R/I correlation diagram illustrating a first current setting characteristic.

Figure 6:
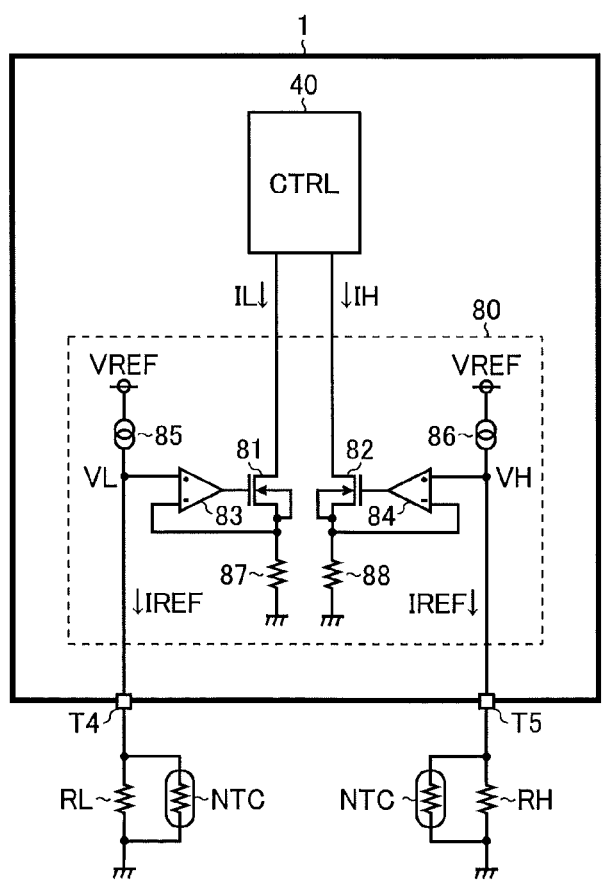
FIG. 6 is a circuit diagram illustrating a second construction example of the current setting portion 80.

FIG. 6 is a circuit diagram illustrating a second construction example of the current setting portion 80. In addition to the construction elements in FIG. 4, the current setting portion 80 in accordance with the second construction example includes the constant current sources 85 and 86 (constant current value: IREF) and the resistors 87 and 88 (resistance: R). The source and the back gate of the transistor 81 are connected to the ground terminal via the resistor 87, not via the external terminal T4. The drain of the transistor 81 is connected to the current controller 40 as the output terminal of the first reference current IL. The gate of the transistor 81 is connected to the output terminal of the operational amplifier 83. The source and the back gate of the transistor 82 are connected to the ground terminal via the resistor 88, not via the external terminal T5. The drain of the transistor 82 is connected to the current controller 40 as the output terminal of the second reference current IH. The gate of the transistor 82 is connected to the output terminal of the operational amplifier 84. The non-inverting input terminal (+) of the operational amplifier 83 is connected to the external terminal T4, not to the voltage applying terminal of the bias voltage VB. The inverting input terminal (−) of the amplifier 83 is connected to the source of the transistor 81. The non-inverting input terminal (+) of the operational amplifier 84 is connected to the external terminal T5, not to the voltage applying terminal of the bias voltage VB. The inverting input terminal (−) of the amplifier 84 is connected to the source of the transistor 82. The constant current source 85 is connected between the voltage applying terminal of the reference voltage VREF and the external terminal T4. The constant current source 86 is connected between the voltage applying terminal of the reference voltage VREF and the external terminal T5.

With respect to the current setting portion 80 in accordance with the second construction example, by flowing the constant current IREF to each of the current setting resistors RL and RH, both the first current setting voltage VL (=IREF*RL) and the second current setting voltage VH (=IREF*RH) are generated, furthermore, by applying the first current setting voltage VL to the resistor 87 and the second current setting voltage VH to the resistor 88, the first reference current IL (=VL/R=IREF*RL/R) and the second reference current IH (=VH/R=IREF*RH/R) are generated. In this way, with respect to the current setting portion 80 in accordance with the second construction example, same with the first construction example, by adjusting the resistances of the current setting resistors RL and RH appropriately, the output current IOUT when turning ON the tail lump (=first reference current IL) and the output current IOUT (=second reference current IH) when turning ON the brake lump can be set independently. Accordingly, the output current IOUT which has different optimum value depends on the kind of the automobile can be adjusted easily and highly accurately.

Figure 7:
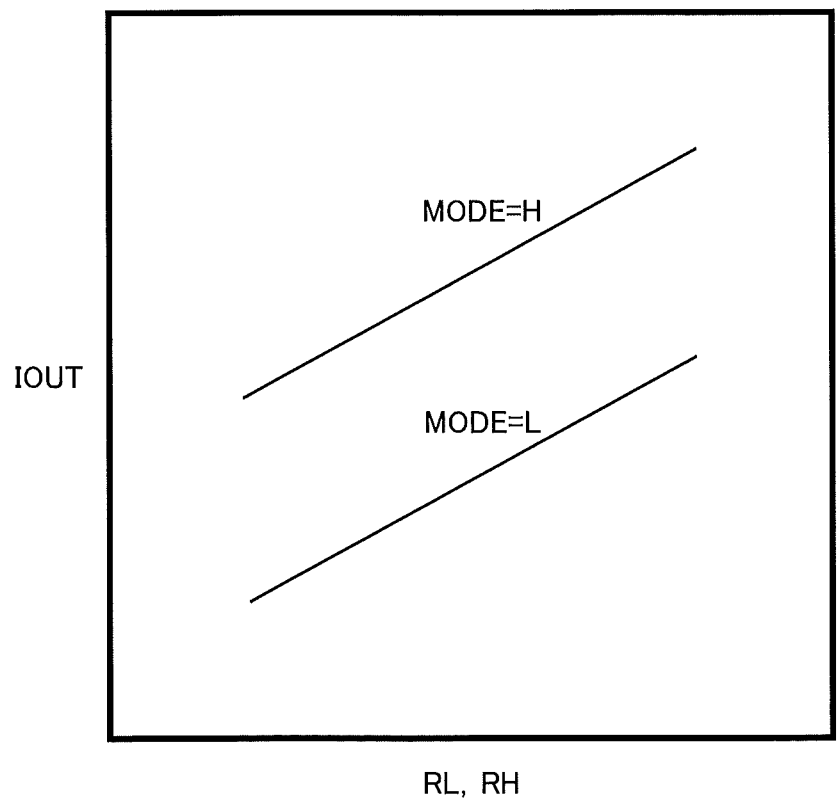
FIG. 7 is a R/I correlation diagram illustrating a second current setting characteristic.

In addition, the second current setting characteristic realized in the current setting portion 80 in accordance with the second construction example becomes positive characteristic (i.e., the larger the resistances of the current setting resistors RL and RH become, the higher the first reference current IL and the second reference current IH become). FIG. 7 is a R/I correlation diagram illustrating a second current setting characteristic. Accordingly, with respect to the current setting portion 80 in accordance with the second construction example, by connecting the negative characteristic thermister [Negative Temperature Coefficient] to each of the current setting resistors RL and RH in parallel, the higher the surrounding temperature becomes, the first reference current IL and the second reference current IH can be reduced. Therefore, it is possible to design a temperature derating of the output current IOUT.

However, with respect to the current setting portion 80 in accordance with the second construction example, as a reason for the fluctuation of the first reference current IL and the second reference current IH, not only the fluctuation of the current setting resistors RL and RH, but the fluctuation of the constant current IREF and the resistor R is included. Therefore, to improve the accuracy of the output current IOUT, it is desirable to design the circuit which can adjust the constant current IREF or the resistance R by trimming.

<PBUS Controller>

Figure 8:
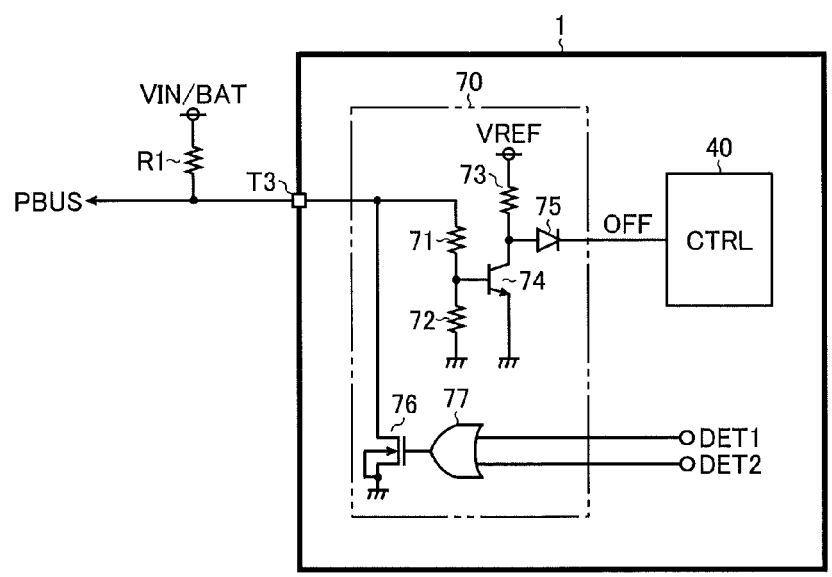
FIG. 8 is a circuit diagram illustrating a construction example of a PBUS controller 70.

FIG. 8 is a circuit diagram illustrating a construction example of the PBUS controller 70. The PBUS controller 70 of this construction example includes the resistors 71 to 73, the npn bipolar transistor 74, the diode 75, the NMOS FET 76, and the logical sum operation circuit 77. The first terminal of the resistor 71 is connected to the external terminal T3. The second terminal of the resistor 71 and the first terminal of the resistor 72 are connected to the base of the transistor 74. The second terminal of the resistor 72 is connected to the ground terminal. The first terminal of the resistor 73 is connected to the voltage applying terminal of the reference voltage VREF. The second terminal of the resistor 73 is connected to the collector of the transistor 74. The emitter of the transistor 74 is connected to the ground. The anode of the diode 75 is connected to the collector of the transistor 74. The cathode of the diode 75 is connected to the current controller 40 or the bias portion 90 as the output terminal of the forcible off signal OFF. The drain of the transistor 76 is connected to the external terminal T3. The source and the back gate of the transistor 76 are connected to the ground terminal. The gate of the transistor 76 is connected to the output terminal of the logical sum operational circuit 77. The first input terminal of the logical sum operational circuit 77 is connected to the input terminal of the LED ground short detection signal DET1. The second input terminal of the logical sum operation circuit 77 is connected to the input terminal of the LED open circuit detection signal DET2. In addition, as not illustrated in FIG. 8 explicitly, other abnormality detection signals can be provided to the logical sum operational circuit 77 (i.e., the ground short detection signal of the current setting resistors RL and RH or the open circuit detection signal).

The PBUS controller 70 of the aforementioned construction sets the forcible off signal OFF to a low level when the protect bus signal PBUS applied to the external terminal T3 is a high level (i.e., a logic level when not detecting the abnormality), on the other hand, sets the forcible off signal OFF to a high level when the protect bus signal PBUS is a low level (i.e., a logic level when detecting the abnormality).

In other words, among the circuit elements forming the PBUS controller 70, the resistors 71 to 73, the transistor 74, and the diode 75 functions as a signal input circuit to generate the forcible off signal OFF according to receiving the protect bus signal PBUS.

In addition, the forcible off signal OFF is provided to the current controller 40 or the bias portion 90, when the forcible off signal OFF becomes a high level (i.e., a logic level when detecting the abnormality), the supply of the output current IOUT is turned OFF forcibly.

Moreover, with respect to the PBUS controller 70 formed with the aforementioned construction, when at least either one of the LED ground short detection signal DET1 and the LED open circuit detection signal DET2 is at a high level (i.e., a logic level when detecting the abnormality), the protect bus signal PBUS is set at a low level (i.e., a logic level when detecting the abnormality).

In other words, among the circuit elements forming the PBUS controller 70, when something abnormality is detected at the IC1 (e.g., LED ground short or the LED open circuit), the transistor 76 and the logical sum operational circuit 77 functions as a signal output circuit with open drain form to switch the protect bus signal PBUS to a low level (i.e., a logic level when detecting the abnormality).

Figure 9:
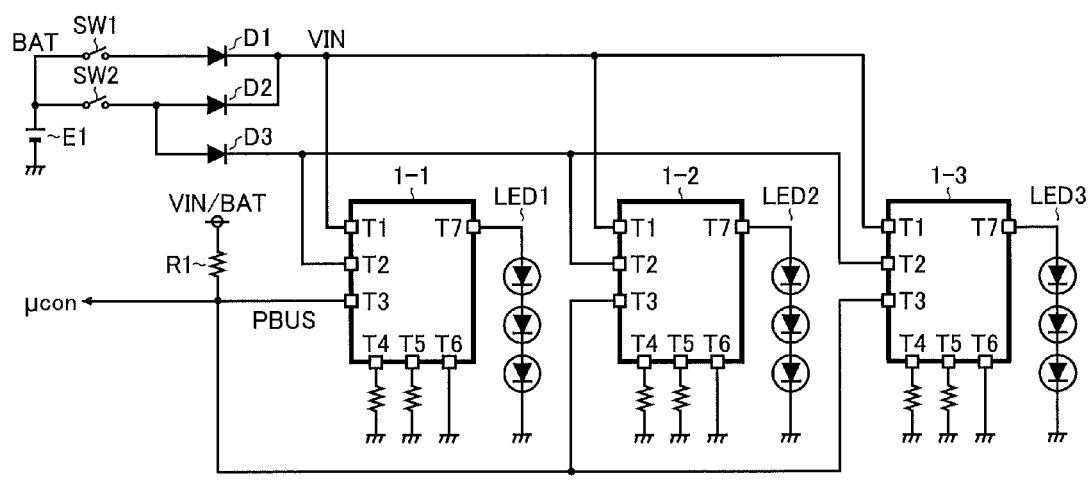
FIG. 9 is an application diagram illustrating an application example of a protect bus signal PBUS.

FIG. 9 is an application diagram illustrating an application example of the protect bus signal PBUS. As mentioned above, the PBUS controller 70 is included in the IC internally, for example, as illustrated in FIG. 9, when driving three lines of the light emitting diode rows LED1 to LED3 by using three driving devices IC1-1 to IC1-3, in case of the ground short or the open circuit are occurred to some light emitting diode row, it is possible to forcibly turn OFF the all lines of the light emitting diode rows LED1 to LED3 at one time. Accordingly, at the testing process, it is possible to select all lines of the light emitting diode rows LED1 to LED3 at once. Moreover, after the mass production (i.e., after the shipment), if there is something wrong with either one of the light emitting diode rows, it is possible to detect it without delay.

<A LED Ground Short Detector>

Figure 10:
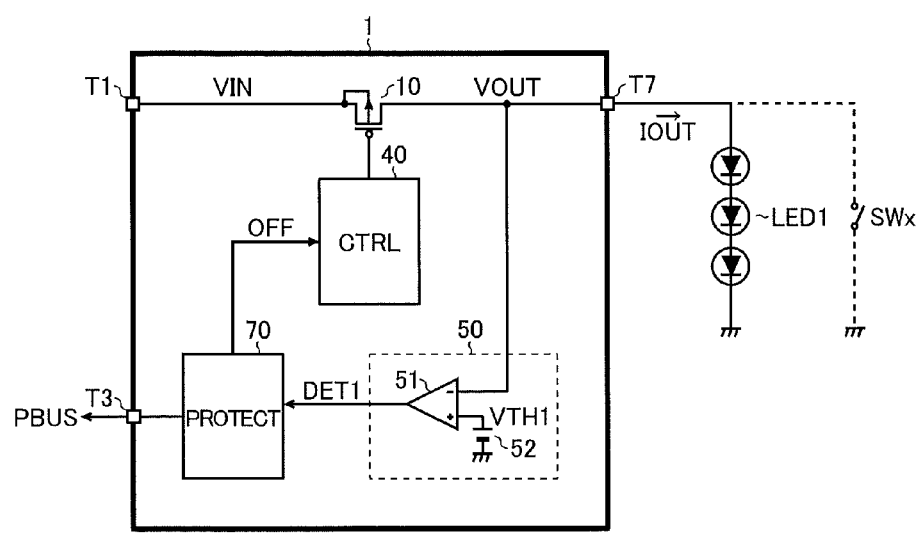
FIG. 10 is a circuit diagram illustrating a first construction example of a LED ground short detector 50.

FIG. 10 is a circuit diagram illustrating a first construction example of a LED ground short detector 50. The ground short detector 50 in accordance with the first construction example includes the comparator 51 and the DC voltage source 52. The inverting input terminal (−) of the comparator 51 is connected to the external terminal T7 (i.e., the voltage applying terminal of the output voltage VOUT). The non-inverting input terminal (+) of the comparator 51 is connected to the positive terminal of the DC voltage source 52 (i.e., the voltage applying terminal of the threshold voltage VTH1). The output terminal of the comparator 51 is connected to the PBUS controller 70 as the output terminal of the LED ground short detection signal DET1.

Figure 11:
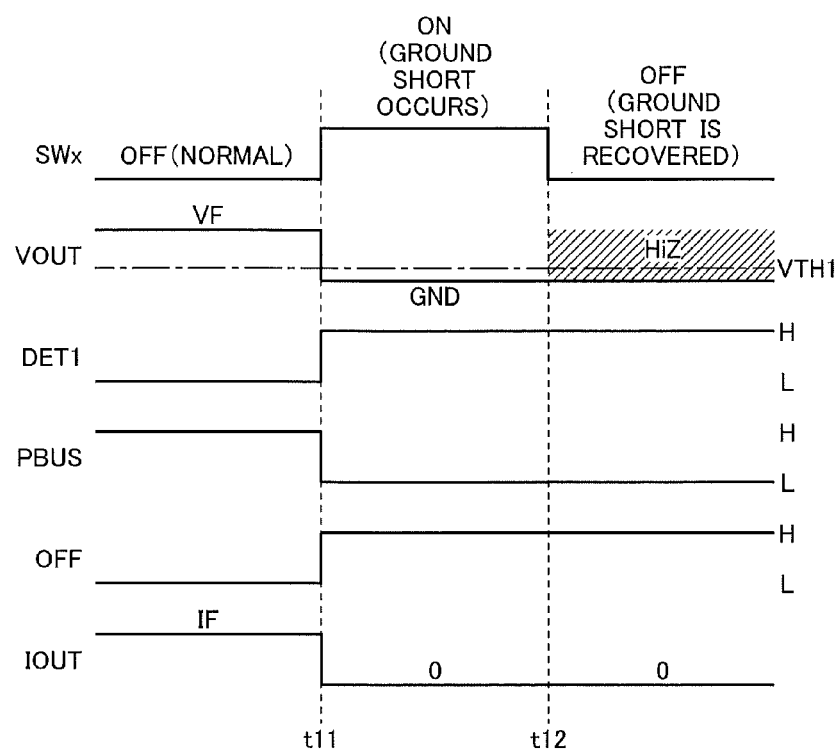
FIG. 11 is a time chart illustrating a first LED ground short detection operation.

FIG. 11 is a time chart illustrating a first LED ground short detection operation realized by the LED ground short detector 50 in accordance with the first construction example. From the top, the state of the LED ground short is occurred (i.e., ON/OFF state of the switch SWx), the output voltage VOUT, the LED ground short detection signal DET1, the protect bus signal PBUS, the forcible off signal OFF, and the output current IOUT are described in order.

At time t11, if the light emitting diode row LED1 connected to the external terminal T7 externally becomes the ground short state (i.e., the switch SWx: ON), according to the output voltage VOUT becomes lower than the threshold voltage VTH1, the LED ground short detection signal DET1 becomes a high level and the LED ground short are detected. During the detection of the LED ground short, the forcible off signal OFF is set as a high level and the output current IOUT is turned OFF forcibly. Owing to this protection operation, it is possible to prevent thermal breakdown of the IC1. Moreover, during the detection of the LED ground short, the protect bus signal PBUS is set as a low level, the abnormality is informed to the outside of the IC1.

In addition, with respect to the LED ground short detector 50 in accordance with the first construction example, even in the case of the ground short state of the light emitting diode row LED1 is recovered at time t12 (i.e., the switch SWx: OFF), because the output voltage VOUT becomes a high impedance state and the LED ground detection signal DET1 is kept at a high level (i.e., a logic level when detecting the abnormality), the OFF state of the output current IOUT is maintained.

Figure 12:
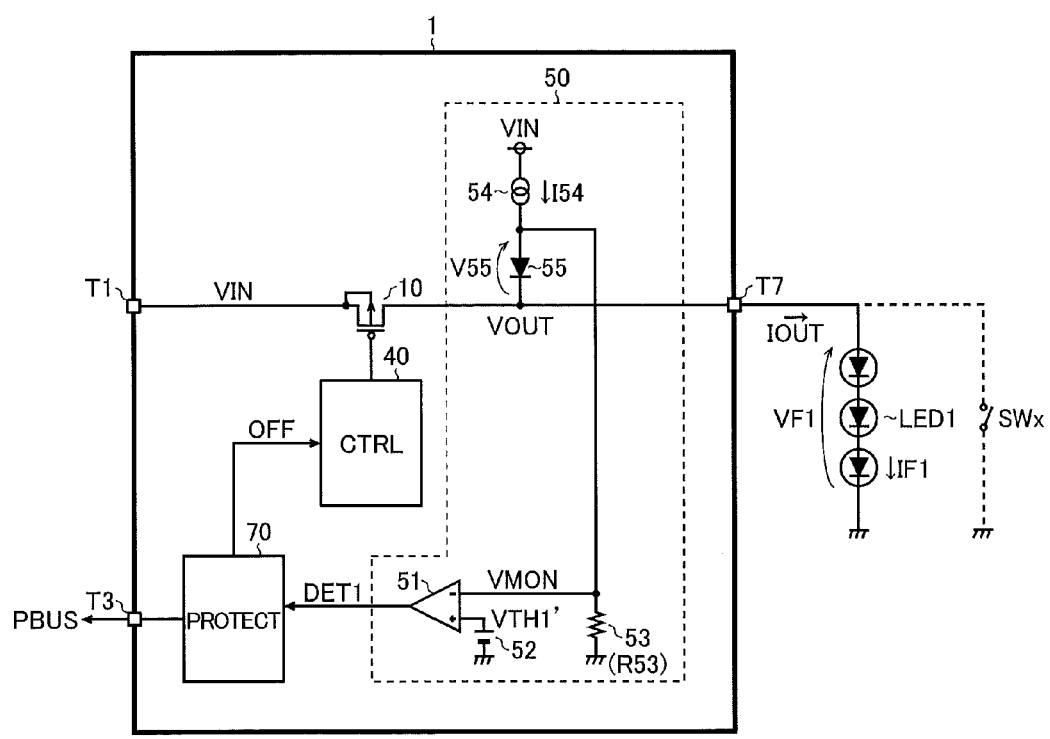
FIG. 12 is a circuit diagram illustrating a second construction example of a LED ground short detector 50.

FIG. 12 is a circuit diagram illustrating a second construction example of a LED ground short detector 50. With respect to the LED ground short detector 50 in accordance with the second construction example, in addition to the construction components in FIG. 10, further including the resistor 53 (the resistance: R53), the constant current source 54 (the constant current value: I54), and the diode 55 (the forward drop voltage: V55). The inverting input terminal (−) of the comparator 51 is connected to the ground terminal via the resistor 53, not via the external terminal T7, on the other hand, also connected to the voltage applying terminal of the monitor voltage VMON (i.e., a connection node between the first terminal of the constant current source 54 and the anode of the diode 55). The cathode of the diode 55 is connected to the external terminal T7. The second terminal of the constant current source 54 is connected to the voltage applying terminal of the input voltage VIN. The non-inverting input terminal (+) of the comparator 51 is connected to the positive terminal of the DC voltage source 52 (i.e., the voltage applying terminal of the threshold voltage VTH1'=VTH1+V55). The output terminal of the comparator 51 is connected to the PBUS controller 70 as the output terminal of the LED ground short detection signal DET1.

Figure 13:
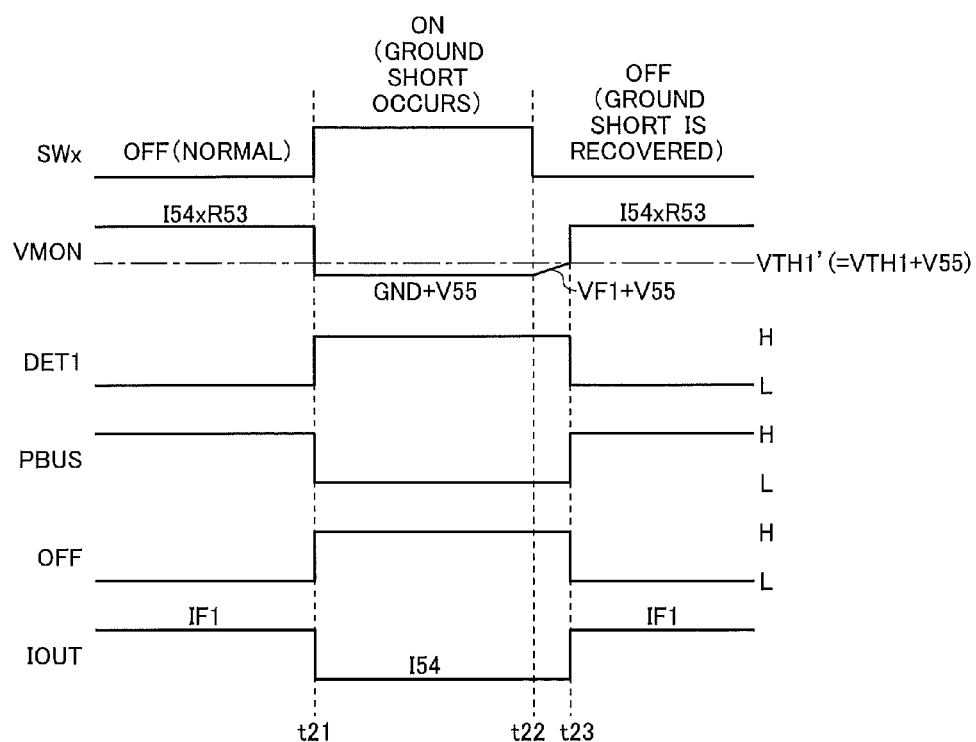
FIG. 13 is a time chart illustrating a second LED ground short detection operation.

FIG. 13 is a time chart illustrating a second LED ground short detection operation realized by the LED ground short detector 50 in accordance with the second construction example. From the top, the state of the LED ground short is occurred (i.e., ON/OFF state of the switch SWx), the monitor voltage VMON, the LED ground short detection signal DET1, the protect bus signal PBUS, the forcible off signal OFF, and the output current IOUT are described in order.

Before the time t21 when the LED ground short is not occurred, the output voltage VOUT (=VF1) is higher than the monitor voltage VMON, because the diode 55 becomes reverse bias state, the constant current provided from the constant current source 54 is flown to the ground terminal via the resistor 53. As a result, the monitor voltage VMON applied to the inverting input terminal (−) of the comparator 51 becomes integrated value of the constant current value I54 and the resistance R53 (=I54*R53). In addition, because the constant current value I54 and the resistance R53 are adjusted as the monitor voltage VMON (=I54*R53) when the LED ground short is not occurred becomes a higher voltage than the threshold voltage VTH1', the LED ground short detection signal DET1 is set as a low level (i.e., a logic level when the abnormality is not detected).

At time t21, if the light emitting diode row LED1 connected to the external terminal T7 externally becomes the ground short state (i.e., the switch SWx: ON), according to the output voltage VOUT becomes low as the ground voltage GND, the diode 55 becomes the forward bias state, the constant current provided from the constant current source 54 flows to the ground terminal via the LED ground short path (i.e., the switch SWx). As a result, the monitor voltage VMON becomes a high voltage value higher than the ground voltage GND by the forward drop voltage V55 of the diode 55 (=GND+V55).

The threshold voltage VTH1' is adjusted as a high voltage value than the monitor voltage VMON (=GND+V55) of the LED ground short is occurred, according to the monitor voltage VMON becomes lower than the threshold voltage VTH1', the LED ground short detection signal DET1 becomes a high level and the LED ground short is detected. During the detection of the LED ground short, same as the first construction example, the forcible off signal OFF is set at a high level, and the output current IOUT is turned OFF forcibly. Owing to this protection operation, it is possible to prevent the thermal breakdown of the IC1. Moreover, during the detection of the LED ground short, the protect bus signal PBUS is set as a low level and the abnormality is informed to the outside of the IC1.

Subsequently, if the ground short state of the light emitting diode row LED1 is recovered at time t22 (the switch SWx: OFF), the constant current provided from the constant current source 54 flows into the ground terminal via the light emitting diode row LED1, and the forward drop voltage VF is generated across the light emitting diode row LED1. As a result, the monitor voltage VMON provided to the inverting terminal (−) of the comparator 51 becomes a high voltage value higher than the forward drop voltage VF of the light emitting diode row LED1 by the forward drop voltage V55 of the diode 55 (=VF+V55). If the monitor voltage VMON becomes higher than the threshold voltage VTH1' at time t23, the LED ground short detection signal DET1 is lowered to a low level (i.e., a logic level when not detecting the abnormality state), and the output current IOUT is recovered to ON state automatically.

As mentioned above, the LED ground short detector 50 in accordance with the second construction example includes a ground short recover circuit (i.e., the resistor 53, the constant current source 54, and the diode 55) to generate the forward drop voltage VF1 by flowing small constant current I54 to the light emitting diode row LED1 when recovering from the LED ground short. Owing to this construction, the supply operation of the output current IOUT can be resumed automatically when recovering from the LED ground short without waiting the recover signal from outside of the IC.

<A LED Open Circuit Detector>

Figure 14:
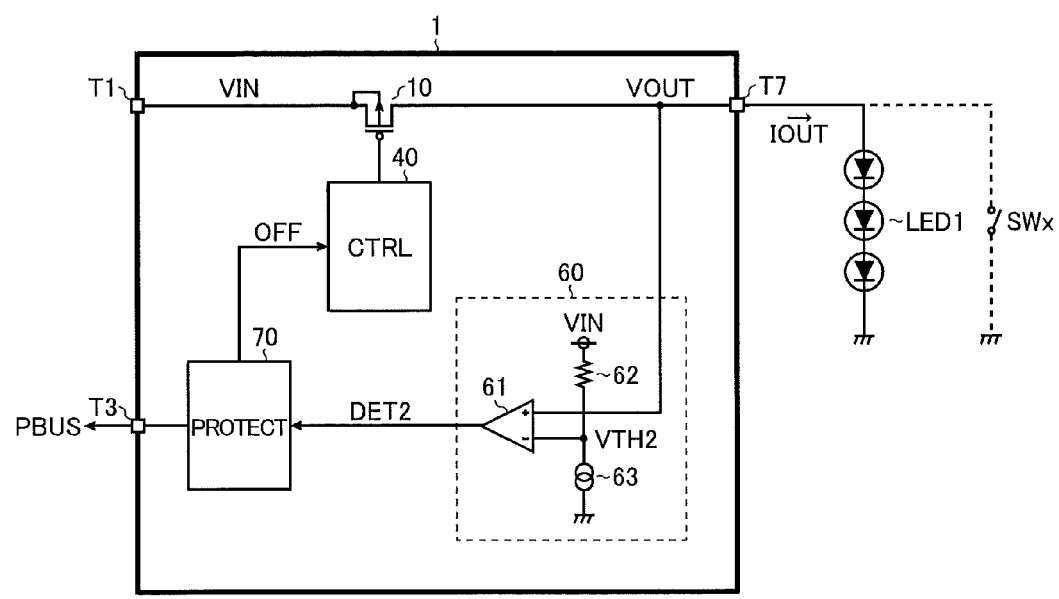
FIG. 14 is a circuit diagram illustrating a first construction example of the LED open circuit detector 60.

FIG. 14 is a circuit diagram illustrating a first construction example of the LED open circuit detector 60. The LED open circuit detector 60 in accordance with the first construction example includes the comparator 61, the resistor 62, and the constant current source 63. The non-inverting input terminal (+) of the comparator 61 is connected to the external terminal T7 (i.e., a voltage applying terminal of the output voltage VOUT). The inverting input terminal (−) of the comparator 61 is connected to the voltage applying terminal of the input voltage VIN via the resistor 62, on the other hand, also connected to the ground terminal via the constant current source 63. The output terminal of the comparator 61 is connected to the PBUS controller 70 as the output terminal of the LED open circuit detection signal DET2. In addition, the threshold voltage VTH2 (=VIN−α) is derived from the connection node between the resistor 62 and the constant current source 63.

If the light emitting diode row LED1 connected to the external terminal T7 externally becomes an open circuit, according to the output voltage VOUT becomes an over voltage state and exceeds the threshold voltage VTH2, the LED open circuit detection signal DET2 becomes a high level and the LED open circuit is detected. During the detection of the LED open circuit, though the protect bus signal PBUS is lowered and an abnormality is informed to outside of the IC1, the forcible turn OFF of the output transistor 10 is not performed different from when detecting the LED ground short. It is because the input voltage VIN is being kept applied to the external terminal T7 and to maintain the detection state of the LED open circuit.

However, with respect to the LED open circuit detector 60 in accordance with the first construction example may causes a false detection of the LED open circuit when the threshold voltage VTH2 becomes smaller than aiming voltage during the low voltage (i.e., when the input voltage VIN is low).

Figure 15:
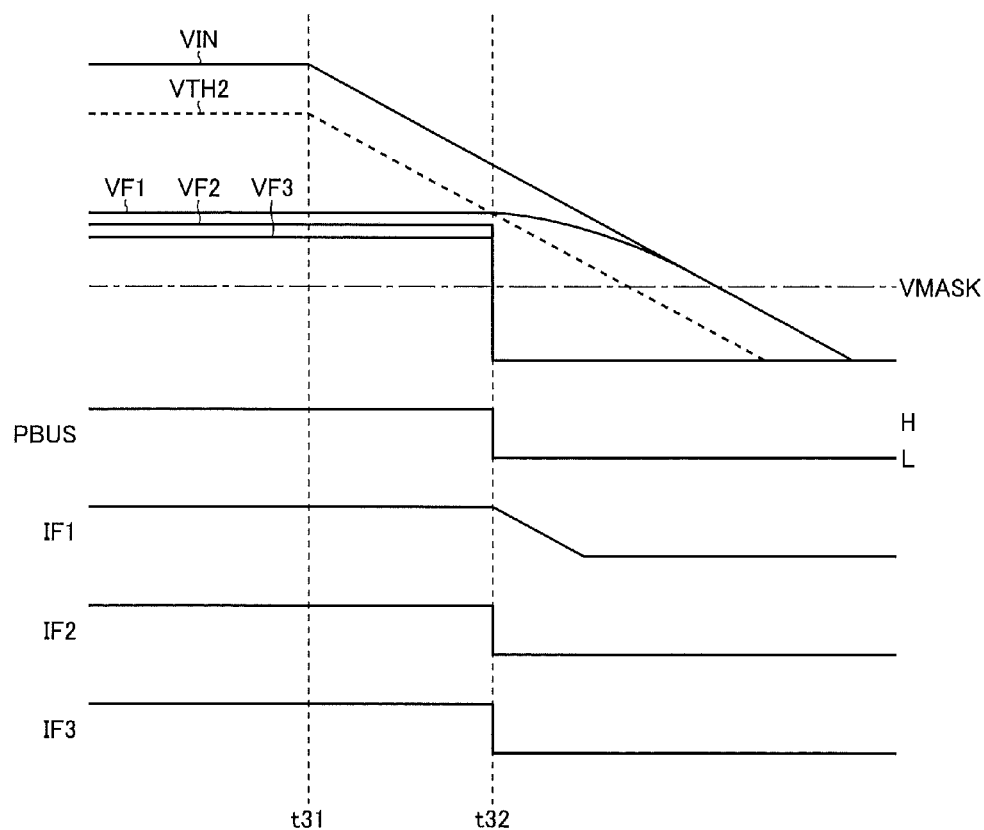
FIG. 15 is a time chart illustrating a false detection operation of the LED open circuit.

FIG. 15 is a time chart illustrating a false detection operation of the LED detector 60 in accordance with the first construction example. From the top, the input voltage VIN, the threshold voltage VTH2, the forward drop voltages VF1 to VF3 of the light emitting diode rows LED1 to LED3 (VF1>VF2>VF3), the protect bus signal PBUS, and the currents IF1 to IF3 which flow the light emitting diode rows LED1 to LED3 respectively are described. In other words, in FIG. 15, the situation where three lines of the light emitting diode rows LED1 to LED3 driven by three ICs IC1-1 to IC1-3 is described in order.

When the input voltage VIN begins to be lowered at time t31, the threshold voltage VTH2 begins to be lowered accordingly. And if the threshold voltage VTH2 becomes lower than the forward voltage drop VF1 of the light emitting diode row LED1 at time t32, the LED open circuit detection signal DET2 is set as a high level unintentionally, and the false detection of the LED open circuit is occurred. If this false detection occurred, based on the aforementioned protect bus function, only the light emitting diode row LED1 which occurs the LED open circuit keeps being turned ON, and other lines of the light emitting diode rows LED2 and LED3 are turned OFF. For example, if the tail lump of the automobile is formed with the light emitting diode rows LED1 to LED3, part of the tail lump is kept being turned ON and the rest are kept being turned OFF. This state is not a preferable state in terms of the safety of the automobile, some resolution is required.

Figure 16:
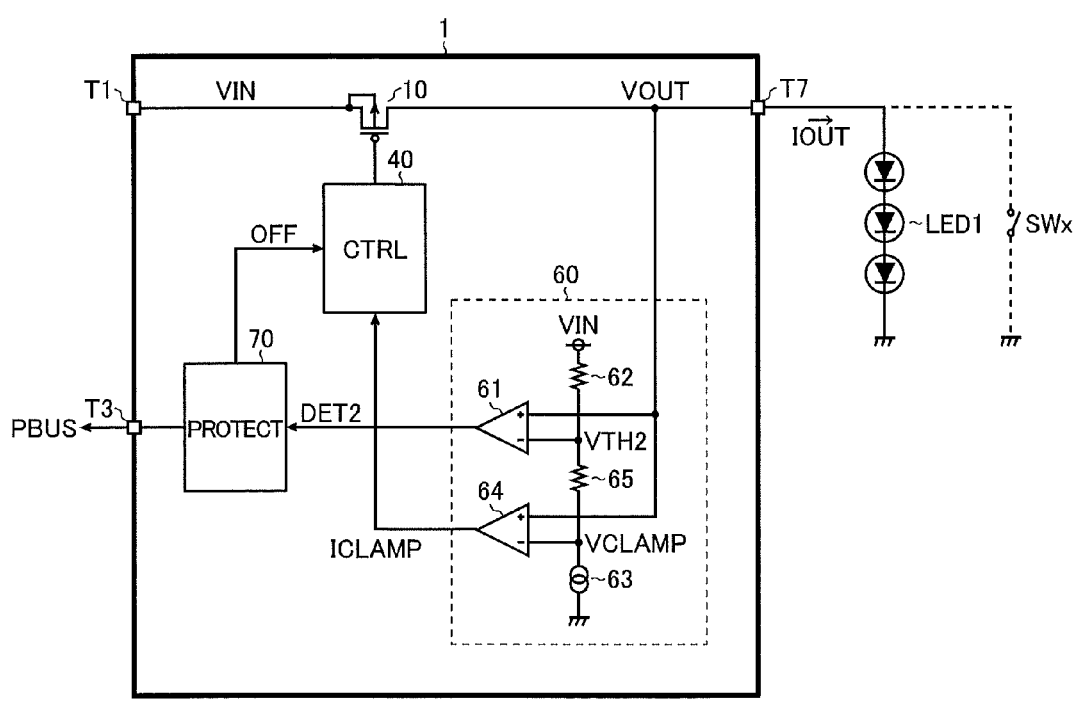
FIG. 16 is a circuit diagram illustrating a second construction example of a LED open circuit detector 60.

FIG. 16 is a circuit diagram illustrating a second construction example of the LED open circuit detector 60. In addition to the construction components in FIG. 14, the LED open circuit detector 60 in accordance with the second construction example includes the operational amplifier 64, and the resistor 65. The non-inverting input terminal (+) of the comparator 61 is connected to the external terminal T7 (i.e., a voltage applying terminal of the output voltage VOUT). The inverting input terminal (−) of the comparator 61 is connected to the voltage applying terminal of the input voltage VIN via the resistor 62, on the other hand, also connected to the ground terminal via the resistor 65 and the constant current source 63. The output terminal of the comparator 61 is connected to the PBUS controller 70 as the output terminal of the LED open circuit detection signal DET2. The non-inverting input terminal (+) of the operational amplifier 64 is connected to the external terminal T7. The inverting input terminal (−) of the operational amplifier 64 is connected to the connection node between the resistor 65 and the constant current source 63. The output terminal of the operational amplifier 64 is connected to the current controller 40 as the output terminal of the current restriction signal ICLAMP (=a voltage signal obtained by amplifying the subtraction between the output voltage VOUT and the clamp voltage VCLAMP). In addition, the threshold voltage VTH2 (=VIN−α) is derived from the connection node between the resistor 62 and the resistor 65, and the clamp voltage VCLAMP (=VIN−α−β) is derived from the connection node between the resistor 65 and the constant current source 63.

Figure 17:
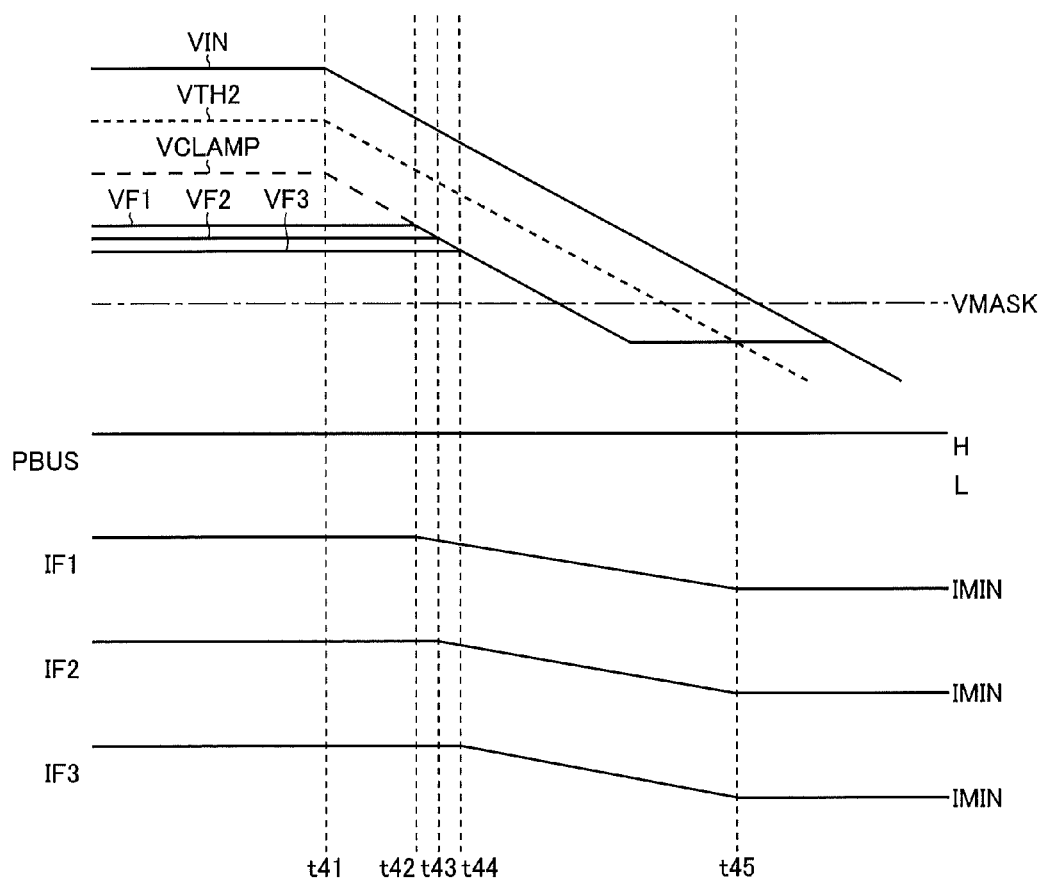
FIG. 17 is a time chart illustrating a false detection avoiding operation of the LED open circuit.
Figure 18:
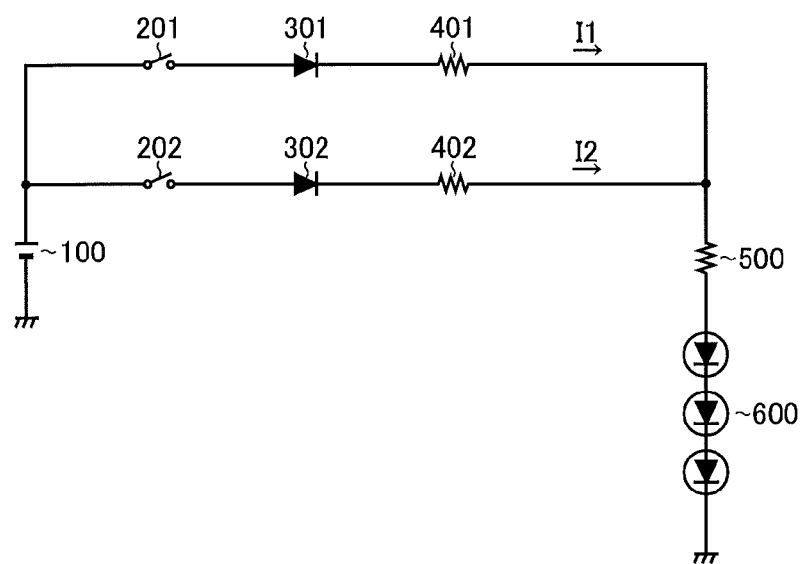
FIG. 18 is a circuit diagram illustrating a conventional example of an automobile LED driving device.

FIG. 17 is a time chart illustrating a false detection avoiding operation of the LED open circuit realized by the LED open circuit detector 60 in accordance with the second construction example. From the top, the input voltage VIN, the threshold voltage VTH2, the clamp voltage VCLAMP, the forward drop voltages VF1 to VF3 of the light emitting diode rows LED1 to LED3 (VF1>VF2>VF3), the protect bus signal PBUS, and the currents IF1 to IF3 which flow the light emitting diode rows LED1 to LED3 respectively are described in order. In other words, in FIG. 17, same as the aforementioned FIG. 15, the situation where three lines of the light emitting diode rows LED1 to LED3 driven by three ICs IC1-1 to IC1-3 is described.

When the input voltage VIN begins to be lowered at time t41, the threshold voltage VTH2 and the clamp voltage VCLAMP begin to be lowered accordingly. And if the clamp voltage VCLAMP becomes lower than the forward voltage drop VF1 of the light emitting diode row LED1 at time t42, the current controller 40 controls and drives the output transistor 10 to reduce the output current IOUT according to the current restriction signal ICLAMP. As a result, according to the reduction of the current IF which flows the light emitting diode row LED1, the forward drop voltage VF1 is being lowered. Accordingly, it is possible to maintain the relationship as VF1<VCLAMP, furthermore, the relationship as VF1<VTH2 is maintained, then it becomes possible to avoid the false detection of the LED open circuit.

Subsequently, if the input voltage VIN is kept being lowered, after time t43 and t44, both the forward drop voltage VF2 and VF3 are restricted as the clamp voltage VCLAMP, all lines of the light emitting diode rows LED1 to LED3 become getting dark uniformly. For example, if the tail lump of the automobile is formed with the light emitting diode rows LED1 to LED3, it becomes a state where the entire tail lump is getting dark gradually. Compared to a state where only part of the tail lump is turned OFF, this state is preferable in terms of the safety of the automobile.

As mentioned above, the LED open circuit detector 60 in accordance with the second construction example includes the comparator 61 which generates the LED open circuit detection signal DET2 based on a comparison between the output VOUT detected as the external terminal T7 to which the light emitting diode row LED1 is connected externally and the predetermined threshold voltage VTH2, the operational amplifier 64 to generate a current restriction signal ICLAMP by amplifying a subtraction between the output voltage VOUT and the clamp voltage VCLAMP. The current controller 40 is a construction to control the output current IOUT to the light emitting diode row LED1 as the output voltage VOUT does not to exceed the clamp voltage CLAMP based on the current restriction signal ICLAMP. According to this construction, it is possible to avoid the false detection of the LED open circuit.

In addition, with respect to the aforementioned current control when the output is saturated, though the output current IOUT can be reduced to a predetermined minimum value IMIN, in the case of the lowering of the input voltage VIN continues, the forward drop voltages VF1 to VF3 of the light emitting diode rows LED1 to LED3 becomes higher than the threshold voltage VTH2 at time t45. In this state, to avoid the false detection as detects the LED open circuit, the detection of the LED open circuit is designed to be ignored as a state where the input voltage VIN is lower than the predetermined mask voltage VMASK.

Effect of the Invention

According to the invention, it is possible to provide an automobile LED driving device to control an output current to an automobile LED easily and highly accurately.

A POSSIBILITY FOR INDUSTRIAL APPLICATION

The invention can be used appropriately to improve safety and reliability of an automobile LED driving device.

OTHER VARIATIONS

With respect to the construction of the invention, in addition to the aforementioned implementations, various modifications can be made without departing from the spirit and the scope of the disclosure. In other words, the aforementioned implementations are just examples, and are not considered as restrictive. The technical scope of the disclosure should be determined based on the scope of the claims, not based on an explanation of the aforementioned implementations. It is understood that any variations within the scope of the claims and equivalents should be included to the scope of the technical scope of the disclosure, other implementations are within the scope of the claims.

LIST OF REFERENCE NUMERALS

1, 1-1 to 1-3 automobile LED driver IC
10 output transistor (PMOS FET)
20 reference voltage generator
30 H/L mode setting portion
31 to 33 resistor 34 npn bipolar transistor
35 inverter
40 current controller
41 PMOS FET
42 selector
50 LED ground short detector
51 converter
52 DC voltage source
53 resistor
54 current source
55 diode
60 LED open circuit detector
61 comparator
62 resistor
63 constant current source
64 operational amplifier
65 resistor
70 protect bus controller (PBUS controller)
71 to 73 resistor
74 npn bipolar transistor
75 diode
76 NMOS FET
77 logical sum operation circuit
80 current setting portion
81 to 82 NMOS FET
83, 84 operational amplifier
85, 86 constant current source
87, 88 resistor
90 bias portion
91, 92 PMOS FET
93, 94 operational amplifier
E1 battery
SW1, SW2 switch
D1 to D3 diode
ZD1 zener diode
C1 capacitor
R1 pull up transistor
RL, RH current setting resistor
LED1 to LED3 light emitting diode row
T1 to T7 external terminal
NTC negative characteristic thermistor

What is claimed is:

1. An automobile LED driving device comprising:
a current setting portion to set multiple reference currents independently from one another for multiple respective current setting resistors connected externally,
a current controller to select one of the multiple reference currents based on a control signal provided from outside, and
an output transistor to control an output current to an automobile LED connected externally based on the reference current selected by the current controller, and
a protect bus controller to generate a protect bus signal according to a detection of an abnormality and to perform an external input/output process for the protect bus signal,
wherein the current controller controls a current supply to the automobile LED based on the protect bus signal.

2. The automobile LED driving device according to claim 1 further comprising:
a LED open circuit detector to detect the open circuit of the automobile LED.

3. The automobile LED driving device according to claim 2, wherein the LED open circuit detector comprises:
a second comparator to generate a LED open circuit detection signal based on a comparison between a terminal voltage of an external terminal to which the automobile LED is connected externally and a second threshold voltage, and
an amplifier to generate a current restriction signal by amplifying a difference between the terminal voltage and a clamp voltage lower than the second threshold voltage,
wherein the current controller controls the output current to the automobile LED based on the current restriction signal so as the terminal voltage not to exceed the clamp voltage.

4. The automobile LED driving device according to claim 1, wherein the current setting portion generates the multiple reference currents by applying constant voltages to multiple respective current setting resistors.

5. The automobile LED driving device according to claim 1, wherein the current setting portion generates multiple current setting voltages by flowing constant currents to the multiple respective current setting resistors, and generates multiple reference currents by applying the multiple current setting voltages to respective internal resistors.

6. The automobile LED driving device according to claim 1 further comprising:
a LED ground short detector to detect the ground short of the automobile LED,
wherein the current controller turns OFF a supply of the output current forcibly when the ground short of the automobile LED occurs.

7. The automobile LED driving device according to claim 6, wherein the LED ground short detector comprises:
a first comparator to generate a LED ground short detection signal based on a comparison between a forward drop voltage of the automobile LED or a monitor voltage according to the forward drop voltage and a first threshold voltage, and
a ground short recovery circuit to generate the forward drop voltage by flowing current to the automobile LED when recovering the ground short of the automobile LED.

8. The automobile LED driving device according to claim 1 further comprising:
a LED open circuit detector to detect the open circuit of the automobile LED.

9. The automobile LED driving device according to claim 8, wherein the LED open circuit detector comprises:
a second comparator to generate the LED open circuit detection signal based on a comparison between a terminal voltage of an external terminal to which the car LED is connected externally and a second threshold voltage, and
an amplifier to generate a current restriction signal by amplifying a difference between the terminal voltage and a clamp voltage lower than the second threshold voltage,
wherein the current controller controls the output current to the automobile LED based on the current restriction signal so as the terminal voltage not to exceed the clamp voltage.

10. An automobile LED driving device comprising:
a current setting portion to set multiple reference currents independently from one another for multiple respective current setting resistors connected externally,
a current controller to select one of the multiple reference currents based on a control signal provided from outside, and an output transistor to control an output current to an automobile LED connected externally based on the reference current selected by the current controller, and a LED ground short detector to detect the ground short of the automobile LED, wherein the current controller turns OFF a supply of the output current forcibly when the ground short of the automobile LED occurs.

11. The automobile LED driving device according to claim 10, wherein the LED ground short detector comprises:

a first comparator to generate a LED ground short detection signal based on a comparison between a forward drop voltage of the automobile LED or a monitor voltage based on the forward drop voltage and a first threshold voltage, and a ground short recovery circuit to generate the forward drop voltage by flowing current to the automobile LED when recovering the ground short of the automobile LED.

12. The automobile LED driving device according to claim 11 further comprising:

a LED open circuit detector to detect the open circuit of the automobile LED.

13. The automobile LED driving device according to claim 12, wherein the LED open circuit detector comprises:

a second comparator to generate the LED open circuit detection signal based on a comparison between a terminal voltage of an external terminal to which the car LED is connected externally and a second threshold voltage, and an amplifier to generate a current restriction signal by amplifying a difference between the terminal voltage and a clamp voltage lower than the second threshold voltage, wherein the current controller controls the output current to the automobile LED based on the current restriction signal so as the terminal voltage not to exceed the clamp voltage.

14. The automobile LED driving device according to claim 10 further comprising:

a LED open circuit detector to detect the open circuit of the automobile LED.

15. The automobile LED driving device according to claim 14, wherein the LED open circuit detector comprises:

a second comparator to generate the LED open circuit detection signal based on a comparison between a terminal voltage of an external terminal to which the car LED is connected externally and a second threshold voltage, and an amplifier to generate a current restriction signal by amplifying a difference between the terminal voltage and a clamp voltage lower than the second threshold voltage, wherein the current controller controls the output current to the automobile LED based on the current restriction signal so as the terminal voltage not to exceed the clamp voltage.

16. An automobile LED driving device comprising:

a current setting portion to set multiple reference currents independently from one another for multiple respective current setting resistors connected externally, a current controller to select one of the multiple reference currents based on a control signal provided from outside, and an output transistor to control an output current to an automobile LED connected externally based on the reference current selected by the current controller, wherein the current setting portion generates multiple current setting voltages by flowing constant currents to the multiple respective current setting resistors, and generates multiple reference currents by applying the multiple current setting voltages to respective internal resistors, and wherein negative characteristic thermistors are connected in parallel to the respective current setting resistors.

17. An automobile LED driving device comprising:

a current setting portion to set multiple reference currents independently from one another for multiple respective current setting resistors connected externally, a current controller to select one of the multiple reference currents based on a control signal provided from outside, and an output transistor to control an output current to an automobile LED connected externally based on the reference current selected by the current controller, wherein the current controller comprises:

an input transistor forming a current mirror circuit with the output transistor and generating a mirror current to the output transistor according to the reference current provided to the input transistor.

18. The automobile LED driving device according to claim 17 further comprising:

a bias portion to equalize a voltage between the source-drain voltages of the input transistor and the output transistor.

* * * * *